United States Patent Office 3,480,630
Patented Nov. 25, 1969

3,480,630
2-ARYLHYDRAZINO-IMIDAZOLINES-(2) AND SALTS THEREOF
Helmut Stahle, Werner Kummer, Herbert Koppe, and Karl Zeile, Ingelheim (Rhine), Wolfgang Hoefke, Budenheim (Rhine), and Hans-Wolfgang Samtleben, Ingelheim (Rhine), Germany, assignors to Boehringer Ingelheim G.m.b.H., Ingelheim (Rhine), Germany, a corporation of Germany
No Drawing. Filed August 7, 1967, Ser. No. 658,662
Claims priority, application Germany, Aug. 5, 1966, B 88,361; Jan. 20, 1967, B 90,823
Int. Cl. C07d 49/34; A61k 27/00; C07c 87/50
U.S. Cl. 260—254
9 Claims

ABSTRACT OF THE DISCLOSURE

The compounds are 2-arylhydrazino-imidazolines-(2) and acid addition salts thereof, useful as hypotensives in warm-blooded animals.

---

This invention relates to novel 2-arylhydrazinoimidazolines-(2) and acid addition salts thereof, as well as to various methods of preparing these compounds.

More particularly, the present invention relates to compounds of the formula

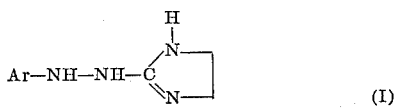

(I)

wherein Ar is unsubstituted naphthyl, tetrahydronaphthyl or indanyl, or mono- or poly-substituted, preferably mono-, di- or tri-substituted, phenyl, naphthyl, tetrahydronaphthyl or indanyl, where the substituents may be identical to or different from each other and are selected from the class consisting of halogen, trifluoromethyl, cyano and alkyl of 1 to 5 carbon atoms, and their non-toxic, pharmacologically acceptable acid addition salts.

A compound according to the present invention may be prepared by a number of different methods involving well known chemical principles, among which the following have proved to be particularly convenient and efficient.

Method A.—By reacting an aryl-hydrazine of the formula $$\text{Ar—NH—NH}_2 \quad \text{(II)}$$

wherein Ar has the same meanings as in Formula I, with an alkylmercapto-imidazolinium salt of the formula

(III)

wherein R is lower alkyl, preferably methyl or ethyl, and X is the anion of an acid, especially of a hydrohalic acid or methanesulfonic acid.

The reaction is advantageously carried out in the manner and under the conditions described in J.A.C.S. 1965, page 474, and yields the corresponding acid addition salt of the desired compound of the Formula I.

An aryl-hydrazine of the Formula II may be prepared by the method described in J.A.C.S. 81, 4673 (1959), and an alkylmercapto-imidazolinium salt of the Formula III may be obtained by the method described in J.A.C.S. 73, 602 (1951).

Method B.—By reacting an N-β-aryl-S-alkyl-isothiosemicarbazonium salt of the formula

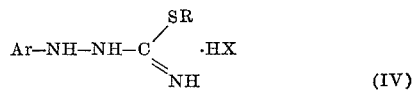

(IV)

wherein Ar has the same meanings as in Formula I and R and X have the same meanings as in Formula III, with ethylenediamine.

The reaction is carried out in a manner and under the conditions analogous to those described in Belgian Patent No. 653,933, yielding the corresponding acid addition salt of the desired compound of the Formula I.

In place of an N-β-aryl-S-alkyl-isothiosemicarbazonium salt of the Formula IV, a simple N-β-aryl-thiosemicarbazide formed by reaction of an aryl-hydrazine of the Formula II with ammonium thiocyanate may be used as a starting material.

A compound of the Formula IV may be obtained by reacting an aryl-hydrazine of the Formula II with ammonium thiocyanate, and reacting the reaction product with an alkyl halide, such as methyliodide, as described in Houben-Weyl, 2nd ed., vol. 9, page 887.

Method C.—By cyclizing an N-β-aryl-N'-(2-aminoethyl)-thiosemicarbazide of the formula

wherein Ar has the same meanings as in Formula I, in a manner and under the conditions analogous to those described in J. Org. Chem. 24, 818 (1959).

Method D.—By reacting an aryl-hydrazine of the Formula II with the reaction product of ethyleneurea and phosphorous pentachloride, which is believed to have the structure of N,N'-bis-(imidazolidinyl-1-one-2-)-phosphoric acid chloride. An analogous process is described in Bull. Soc. Chim. France 1961, page 2114.

Method E.—By reducing an arylazo-imidazoline of the formula

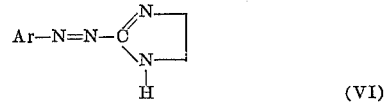

(VI)

wherein Ar has the same meanings as in Formula I. The reduction is preferably carried out wtih the aid of nascent hydrogen generated by means of a mixture of zinc dust and a mineral acid, for example.

Method F.—By reacting an N-arylamino-N'-nitroguanidine of the formula

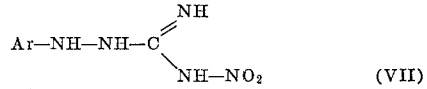

(VII)

wherein Ar has the same meanings as in Formula I, with ethylenediamine or a salt thereof.

The reaction is carried out by dissolving the N-arylamino-N'-nitroguanidine of the Formula VII in a suitable solvent, preferably a polar solvent such as an alkanol, adding to the solution an equimolar amount or a moderate excess thereover of ethylenediamine or a salt thereof, and heating the mixture. The optimum required reaction temperature depends upon the reactivity of the N-arylamino-N'-nitroguanidine starting compound, but should not exceed the reflux temperature of the solvent which is used.

An N-arylamino-N'-nitroguanidine of the Formula VII may be obtained by reacting equimolar amounts of an arylhydrazine and N-methyl-N-nitroso-N'-nitroguanidine in ethanol at room temperature, as described by R. A. Henry in J.A.C.S. 72, 5343.

The 2-arylhydrazino-imidazolines-(2) of the Formula

I are organic bases and therefore form acid addition salts with inorganic or organic acids. Such acid addition salts may be obtained in customary fashion, that is, by dissolving the free base in a suitable solvent and acidifying the solution with the desired inorganic or organic acid. Examples of non-toxic, pharmacologically acceptable acid addition salts include, but are not limited to, those formed with hydrochloric acid, hydrobromic acid, hydroiodic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicylic acid, ascorbic acid, 8-chloroetheophylline and the like.

The following examples further illustrate the present invention and will enable others skilled in the art to understand it more completely. It should be understood, however, that the invention is not limited solely to the particular examples given below.

EXAMPLE 1

Preparation of 2-o-tolyl-hydrazino-imidazoline-(2)hydroiodide by method A

A mixture of 23 gm. (0.19 mol) of o-tolyl-hydrazine and 34.2 gm. (0.14 mol) of 2-methylmercapto-imidazoline hydroiodide and 70 cc. of amyl alcohol was refluxed for four hours. Thereafter, the reaction solution was allowed to cool, during which time 7 gm. of a precipitate crystallized out. The liquid phase was concentrated by evaporation, whereupon 5 gm. more of precipitate separated out. The precipitates were combined (total yield of raw product 27.9% of theory) and recrystallized from water and ethanol. The purified product had a melting point of 238–241° C. and was identified to be 2-o-tolyl-hydrazino-imidazoline-(2) hydroiodide of the formula

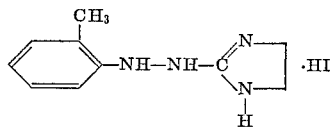

EXAMPLE 2

Preparation of 2-[(2′,6′-dichloro-phenyl)-hydrazino]-imidazoline-(2) hydroiodide by method A A mixture of 13.3 gm. (0.075 mol) of 2,6-dichlorophenyl-hydrazine, 12.2 gm. of 2-methylmercapto-imidazoline hydroiodide and 44 cc. of amyl alcohol was refluxed for three hours, during which time methyl mercaptan was given off. Thereafter, the reaction solution was allowed to cool, the precipitate formed thereby was separated by vacuum filtration, and the filtrate was concentrated in vacuo. Cold acetone was added to the residue, whereupon a solid substance crystallized out which was collected by vacuum filtration and washed with cold acetone. After recrystallization from a mixture of methanol and ether, the pure product had a melting point of 254° C. It was identified to be 2-[(2′,6′-dichloro-phenyl)-hydrazino]-imidazoline-(2) hydroiodide of the formula

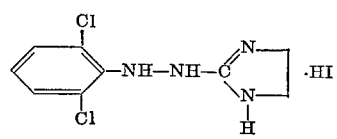

EXAMPLE 3

Preparation of 2-[(2′,4′-dibromo-phenyl)-hydrazino]-imidazoline-(2) hydroiodide by method B 7.5 gm. (0.016 mol) of N-β-2,4-dibromophenyl-S-methyl-isothiosemicarbazonium-hydroiodide were dissolved in 60 cc. of isoamyl alcohol, 1.2 gm. (0.02 mol) of ethylene-diamine were added to the solution, and the mixture was heated for one hour at 130° C. in an atmosphere of nitrogen and then allowed to stand overnight at room temperature. 4.2 gm. of a solid substance crystallized out, and after concentrating the mother liquor an additional 0.6 gm. of the same substance separated out; the total yield of raw product was 65% of theory. The raw product was recrystallized first from a mixture of acetone, ether and water and then from a mixture of methanol and water, whereupon it had a melting point of 238–240° C. It was identified to be 2-[(2′,4′-dibromo-phenyl)-hydrazino] - imidazoline - (2) hydroiodide of the formula

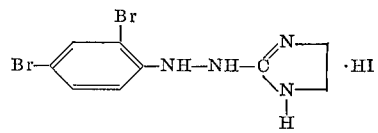

EXAMPLE 4

Preparation of 2-[(2′,4′,6′-trichloro-phenyl)-hydrazino]-imidazoline-(2) and is its hydrochloride by method B 6.2 gm. (0.015 mol.) of N-β-2,4,6-trichlorophenyl-S-methyl-isothiosemicarbazonium-hydroiodide, M.P. 205–207° C., and 1.2 gm. (0.02 mol) of ethylenediamine were dissolved in 30 cc. of amyl alcohol, and the solution was boiled for one hour. Thereafter, the amyl alcohol was distilled off, the residue was made alkaline with sodium hydroxide, the alkaline mixture was extracted with ether, and the ether extract was dried and sodium sulfate. The dry ethereal solution, which contained 2-[(2′,4′,6′-trichloro-phenyl)-hydrazino]-imidazoline-(2), was acidified with ethereal hydrochloric acid, and the precipitate formed thereby was collected and recrystallized from a mixture of methanol and ether. 1.1 gm. (23.2% of theory) of a substance having a melting point of 257–261° C. (decomposition) were obtained. It was identified to be 2-[(2′,4′,6′-trichlorophenyl)-hydrazino]-imidazoline - (2) hydrochloride of the formula

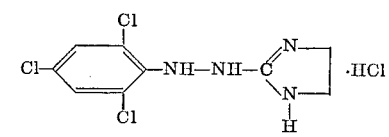

EXAMPLE 5

Preparation of 2-[(2′-methyl-5′-chloro-phenyl)-hydrazino]-imidazoline-(2) hydroiodide by method B A mixture of 7.8 gm. (0.05 mol) of N-β-2-methyl-5-chlorophenyl-S-methyl-isothiosemicarbazonium - hydroiodide, 3.9 gm. (0.06 mol) of ethylenediamine and 80 cc. of isoamyl alcohol was boiled for one hour in an atmosphere of nitrogen. Thereafter, the reaction solution was allowed to cool; after fifteen hours of standing 13.4 gm. (76% of theory) of a crystalline substance had separated out, which was collected by vacuum filtration, dissolved in methanol and fractionally re-precipitated with ether. The pure product had a melting point of 225–226° C. and was identified to be 2-[(2′-methyl-5′-chloro-phenyl)-hydrazino]-imidazoline-(2) hydroiodide of the formula

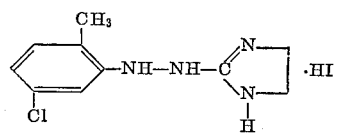

EXAMPLE 6

Preparation of 2-[(2′-chloro-4′-methyl - phenyl) - hydrazino]-imizaboline-(2) and its hydrochloride by method B 13.4 gm. (0.04 mol) of N-β-2-chloro-4-methylphenyl S-methyl-isosemicarbazonium-hydroiodide and 3.0 gm. (0.05 mol) of ethylenediamine were dissolved in 100 cc. of isoamyl alcohol, and the solution was refluxed for one hour in an atmosphere of nitrogen. Thereafter, the isoamyl alcohol and the excess, unreacted ethylenediamine were distilled off, and the residue was taken up in methanol and reprecipitated with ether. 6.4 gm. (45.3% of theory) of 2-[(2'-chloro-4'-methyl-phenyl)-hydrazino]-imidazoline-(2) hydroiodide were obtained; this product was dissolved in water, and the solution was made alkaline with ammonia. The free base, 2-[(2'-chloro-4'-methyl-phenyl)-hydrazino]-imidazoline-(2), precipitated thereby was isolated, washed thoroughly with water, dissolved in ether, the ethereal solution was acidified with ethereal hydrochloric acid and the precipitate was collected. It had a melting point of 238–241° C. and was identified to be 2-[(2'-chloro-4'-methyl-phenyl)-hydrazino]-imidazoline-(2) hydrochloride of the formula

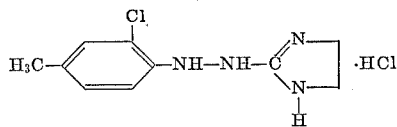

EXAMPLE 7

Preparation of 2-(p-tolyl hydrazino)-Δ2-imidazoline and its oxalate by method B 35.5 gm. (0.11 mol) of N-β-p-tolyl-S-methyl-isothiosemicarbazonium hydroiodide were dissolved in 100 cc. of isoamyl alcohol, and 9.6 gm. (0.16 mol) of ethylenediamine were added to the solution. The mixture was boiled for one hour in an atmosphere of nitrogen, and thereafter the isoamyl alcohol was distilled off in vacuo. The residue was admixed with aqueous 5% sodium hydroxide, and the alkaline mixture was extracted three times with 80 cc. portions of ether. The ethereal extracts were combined, washed with water and dried with magnesium sulfate. The dry ethereal solution, containing the free base 2 - (p-tolyl-hydrazino)-imidazoline-(2), was acidified with a freshly prepared solution of anhydrous oxalic acid in ether, whereby 17.2 gm. (56% of theory) of 2-(p-tolyl-hydrazino)-Δ2-imidazoline acid oxalate precipitated out. The raw product was recrystallized first from a mixture of methanol and ether and then from water in the presence of activated charcoal. The purified product had a melting point of 169–170° C.

EXAMPLE 8

Preparation of 2-(4'-chlorophenyl-hydrazino)-Δ2-imidazoline and its oxalate by method B 7.0 gm. (0.03 mol) of 4-chlorophenylhydrazido-dithiocarbonic acid methyl ester, M.P. 140–141° C., and 2.4 gm. (0.04 mol) of ethylenediamine were dissolved in 100 cc. of isoamyl alcohol, and the solution was refluxed for one hour in an atmosphere of nitrogen. Thereafter, the isoamyl alcohol was distilled off in vacuo, the residue was admixed with aqueous 5% sodium hydroxide, and the alkaline mixture was extracted three times with 50 cc. portions of ether. The ether extract solutions were combined, washed with water and dried with magnesium sulfate. The dry ethereal solution, containing the free base 2-(4'-chlorophenyl-hydrazino)-imidazoline-(2), was acidified with a freshly prepared solution of anhydrous oxalic acid in ether, whereby 3.6 gm. (40% of theory) of raw 2-(4'-chlorophenyl-hydrazino)-Δ2-imidazoline acid oxalate precipitated out. The yellowish-brown crystalline product was recrystallized first from a mixture of methanol and ether and then from water, whereupon it had a melting point of 192–193° C.

EXAMPLE 9

Preparation of 2-(2'-bromophenyl-hydrazino)-imidazoline-(2) and its hydrochloride by method B 2.5 gm. (0.016 mol) of o-bromophenyl-hydrazine and 1 gm. (0.004 mol) of N,N'-bis-(imidazolidinyl-1-one-2)-phosphoric acid chloride (prepared from ethyleneurea and phosphorus pentachloride in chloroform pursuant to Bull. Soc. Chim. France 1961, page 2114) were dissolved in 12 cc. of xylene, and the solution was refluxed for four hours. During that time a reddish-brown solid substance precipitated out, which was found to be raw 2-(2'-bromophenyl-hydrazino)-imidazoline-(2). The raw product was collected and dissolved in methanol, the resulting solution was acidified with hydrochloric acid, and the acid solution was admixed with ether until precipitation was complete. The precipitate was identified to be 2-(2'-bromophenyl-hydrazino)-imidazoline-(2) hydrochloride, which had a melting point of 222–223° C. and was identical to the end product of Example 18.

EXAMPLE 10

Preparation of 2-(2',4'-dichlorophenyl-hydrazino)-imidazoline-(2) and its oxalate by method E 0.5 gm. of 2-(2',4'-dichlorophenyl-azo)-imidazoline-(2), M.P. 159–160° C., were dissolved in 8 cc. of aqueous 50% formic acid, 0.5 gm. of zinc dust were added to the solution, and the mixture was shaken, whereby the initially deep red solution became colorless. The excess zinc dust was filtered off, the filtrate was diluted with water, and the aqueous acid solution was made alkaline with sodium hydroxide, whereby the free base 2-(2',4'-dichlorophenyl-hydrazino)-imidazoline-(2) precipitated out. The free base was taken up in ether, the solution was dried with magnesium sulfate, and the dry ethereal solution was acidified with anhydrous oxalic acid. The precipitate formed thereby was collected and recrystallized from a mixture of methanol and ether, yielding 2-(2',4'-dichlorophenyl-hydrazino)-imidazoline-(2) oxalate, M.P. 178–180° C.

EXAMPLE 11

Preparation of 2-(2'-bromophenyl-hydrazino)-imidazoline-(2) p-toluene sulfonate by method F 6.0 gm. (0.022 mol) of N-(2-bromoanilino)N'-nitroguanidine, M.P. 151–152° C., were admixed with 4.5 gm. (0.011 mol) of ethylenediamine di-p-toluenesulfonate, 0.66 gm. (0.011 mol) of ethylenediamine and 60 cc. of ethanol, and the mixture was refluxed for five hours. Thereafter, the reaction solution was evaporated to dryness in vacuo, and the residue was dissolved in a small amount of methanol and reprecipitated therefrom with ether. 1.1 gm. (11.7% of theory) of 2-(2'-bromophenyl-hydrazino)-imidazoline-(2) p-toluenesulfonate, M.P. 131–132° C. (recrystallized from n-propanol), were obtained.

EXAMPLE 12

Preparation of 2-[(2'-methyl-3'-chloro-phenyl)-hydrazino]-imidazoline-(2) p-toluenesulfonate by method F Using a procedure analogous to that described in Example 11, 2-[(2'-methyl-3'-chloro-phenyl)-hydrazino]-imidazoline-(2) p-toluenesulfonate, M.P. 220–222° C., was prepared from N-(2-methyl-3-chloro-anilino)-N'-nitroguanidine, M.P. 160–161° C., and ethylenediamine mono-p-toluenesulfonate. The yield was 25.8% of theory.

EXAMPLE 13

Using a procedure analogous to that described in Example 3, 2-[(2',6'-dimethyl-phenyl)-hydrazino]-imidazoline-(2) hydroiodide, M.P. 224–226° C., of the formula

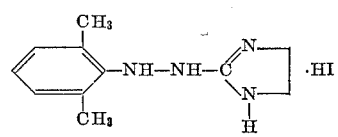

was prepared from N-β-2,6-dimethyl-phenyl-S-methyl-isothiosemicarbazonium-hydroiodide and ethylenediamine.

EXAMPLE 14

Using a procedure analogous to that described in Example 3, 2-[(2,6-diethyl-phenyl)-hydrazino]-imidazoline-(2) hydroiodide, M.P. 155–156° C., of the formula

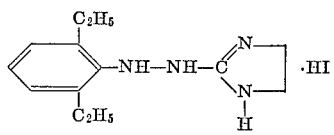

was prepared from N-β-2,6-diethyl-phenyl-S-methyl-isothiosemicarbazonium-hydroiodide and ethylenediamine.

EXAMPLE 15

Using a procedure analogous to that described in Example 3, 2-[(p-chloro-phenyl)-hydrazino]-imidazoline-(2) hydroiodide, M.P. 183–185° C., of the formula

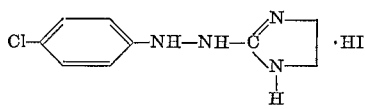

was prepared from N-β-p-chloro-phenyl-S-methyl-isothiosemicarbazonium-hydroiodide and ethylenediamine.

EXAMPLE 16

Using a procedure analogous to that described in Example 3, 2-[(3',4'-dichloro-phenyl)-hydrazino]-imidazoline-(2) hydroiodide, M.P. 197–198° C., of the formula

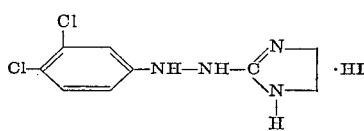

was prepared from N-β-3,4-dichloro-phenyl-S-methyl-isothiosemicarbazonium-hydroiodide and ethylenediamine.

EXAMPLE 17

Using a procedure analogous to that described in Example 3, 2-[(o-chloro-phenyl)-hydrazino]-imidazoline-(2) hydroiodide, M.P. 236–238° C., of the formula

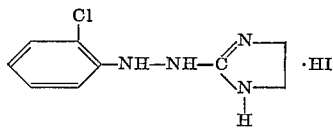

was prepared from N-β-o-chloro-phenyl-S-methyl-isothiosemicarbazonium-hydroiodide and ethylenediamine.

EXAMPLE 18

Using a procedure analogous to that described in Exaxmple 3, 2-[(o-bromo-phenyl)-hydrazino]-imidazoline-(2) hydroiodide, M.P. 222–223° C., of the formula

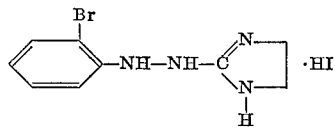

was prepared from N-β-o-bromo-phenyl-S-methyl-isothiosemicarbazonium-hydroiodide and ethylenediamine.

EXAMPLE 19

Using a procedure analogous to that described in Example 3, 2-[(2',4'-dichloro-phenyl)-hydrazino]-imidazoline-(2) hydroiodide, M.P. 223–225° C., of the formula

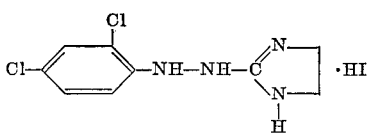

was prepared from N-β-2,4-dichloro-phenyl-S-methyl-isothiosemicarbazonium-hydroiodide and ethylenediamine.

EXAMPLE 20

Using a procedure analogous to that described in Example 7, 2-[(m-trifluoromethyl-phenyl)-hydrazino]-imidazoline-(2) acid oxalate, M.P. 169–170° C., of the formula

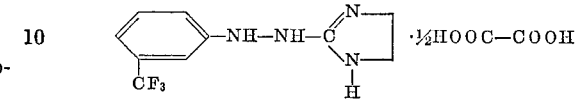

was prepared from N-β-m-trifluoromethyl-phenyl-S-methyl-isothiosemicarbazonium-hydroiodide and ethylenediamine.

The compounds according to the present invention, that is, the free bases embraced by Formula I above and their non-toxic, pharmacologically acceptable acid addition salts, have useful pharmacodynamic properties. More particularly, they exhibit hypotensive activities and inhibit gastric secretion in warm-blooded animals, such as rabbits, dogs and human beings. Especially effective in this respect are those compounds of the instant invention where Ar in Formula I is an aryl radical, preferably phenyl, having a halogen, cyano, trifluoromethyl and/or methyl substitutent attached thereto in one or both of the ortho-positions. Specific examples of such compounds are 2-[(2',6'-dichloro-phenyl)-hydrazino]-imidazole-(2),
2-[(2',4'-dichloro-phenyl)-hydrazino]-imidazoline-(2),
2-[(2',4',6'-trichloro-phenyl)-hydrazino]-imidazoline-(2),
2-[(2'-methyl-5'-chloro-phenyl)-hydrazino]-imidazoline-(2)

or a nontoxic, phamarcologically acceptable acid addition salt of any of these.

For pharmaceutical purposes the compounds according to the present invention are administered to warm-blooded animals requiring hypotensive treatment by the oral of parenteral route as active ingredients in customary dosage unit compositions, that is, compositions consisting essentially of an inert pharmaceutical carrier and one dosage unit of the active ingredient, such as tablets, coated pills, capsules, wafers, solutions, suspensions, emulsions, powders, syrups, suppositories or the like. In addition to one dosage unit of a compound according to the present invention, such compositions may also contain one dosage unit of another active ingredient, such as another hypotensive ingredient of the benzothiadiazine class, or a spasmolytic ingredient. One dosage unit of the compounds according to the present invention is from 0.008 to 1.4 mgm./kg. body weight, preferably 0.05 to 0.5 mgm./kg. body weight.

The following examples illustrate dosage unit compositions comprising a compound according to the invention as an active ingredient, and represent the best mode contemplated of putting the instant invention to practical use. The parts are parts by weight unless otherwise specified.

EXAMPLE 21

Tablets.—The tablet composition was compounded from the following ingredients:

| | Parts |
|---|---|
| 2-[(2',6' - dichloro-phenyl)-hydrazino]-imidazoline-(2) | 5 |
| Lactose | 70 |
| Corn starch | 125 |
| Secondary calcium phosphate | 40 |
| Soluble starch | 3 |
| Magnesium stearate | 3 |
| Colloidal silicic acid | 4 |
| Total | 250 |

Compounding procedure.—The imidazoline compound was intimately admixed with approximately one-half of the required amounts of the lactose, corn starch, calcium phosphate, magnesium stearate and silicic acid, and the resulting mixture was granulated by moistening it with an aqueous solution of the soluble starch and forcing the moist mass through a screen. The granulate was then admixed with the remainder of the lactose, corn starch, calcium phosphate, magnesium stearate and silicic acid, and the mixture was pressed into 250 mgm. tables with the aid of a conventional tablet making machine. Each table contained 5 mgm. of the imidazoline compound and, when administered perorally to a warm-blooded animal of about 60 kg. body weight requiring hypotensive treatment, produced very good hypotensive effects.

EXAMPLE 22

Hypodermic solution.—The solution was compounded from the following ingredients:

2-[2'-methyl-5'-chloro-phenyl)-hydrazino]-
  imidazoline-(2) _____ parts__  0.5
Sodium chloride _____ do____ 18.0
Distilled water q.s.ad. _____ parts by vol.__ 2000.0

Compounding procedure.—The imidazoline compound and the sodium chloride were dissolved in a sufficient amount of distilled water the solution was filtered until free from suspended particles, and the filtrates was filled into 2 cc. ampules in an atmosphere of nitrogen. The filled ampules were then sterilized at 120° C. for twenty minutes and sealed. Each ampule contained 0.5 mgm. of the imidazoline compound, and when the contents of one ampule were administered by the intramuscular route to a warm-blooded animal of about 60 kg. body weight requiring hypotensive treatment, they produced very good hyptotensive effects.

Although the above dosage unit composition examples illustrate only two specific compounds of the present invention as active ingredients, it should be understood that any other compound embraced by Formula I or a non-toxiv, pharmacologically acceptable acid addition salt thereof may be substituted for the particular imidazoline compound illustrated in Examples 21 and 22. Moreover, the amount of active ingredient in these examples may be varied to achieve the dosage unit range set forth above, and the nature and amounts of the inert pharmaceutical carrier components may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention.

We claim:

1. A compound of the formula

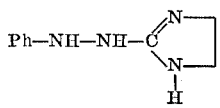

wherein Ph is

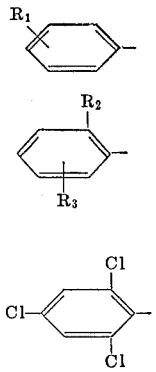

where $R_1$ is methyl, chloride, bromine or trifluoromethyl, and $R_2$ and $R_3$ are each alkyl of 1 to 2 carbon atoms, chlorine or bromine or a non-toxic, pharmacologically acceptable acid addition salt thereof.

2. A compound according to claim 2, wherein Ph is o-tolyl, or a non-toxic, pharmacologically acceptable acid addition salt thereof.

3. A compound according to claim 2, wherein Ph is 2,6-dichlorophenyl, or a non-toxic, pharmacologically acceptable acid addition salt thereof.

4. A compound according to claim 2, wherein Ph is 2,4-dibromophenyl, or a non-toxic, pharmacologically acceptable acid addition salt thereof.

5. A compound according to claim 2, wherein Ph is 2,4,6-trichlorophenyl, or a non-toxic, pharmacologically acceptable acid addition salt thereof.

6. A compound according to claim 2, wherein Ph is 2,4-dichlorophenyl, or a non-toxic, pharmacologically acceptable acid addition salt thereof.

7. A compound according to claim 2, wherein Ph is 2-methyl-5-chlorophenyl, or a non-toxic, pharmacologically acceptable acid addition salt thereof.

8. A compound according to claim 2, wherein Ph is 2-chloro-4-methylphenyl, or a non-toxic, pharmacologically acceptable acid addition salt thereof.

9. A compound according to claim 2, wherein Ph is 2-bromophenyl, or a non-toxic, pharmacologically acceptable acid addition salt thereof.

References Cited

Bontempo et al.: In: Finland et al. Antimicrobial Agents and Chemotherapy, 1961, pp. 795–801, Detroit, Amer. Soc. Microbiology, 1962, RS161. A59.

HENRY R. JILES, Primary Examiner

NATALIE TROUSOF, Assistant Examiner

U.S. Cl. X.R.

260—157, 309.6, 551, 552, 564, 569; 424—253, 273

PO-1050
(5/69)

UNITED STATES PATENT OFFICE
CERTIFICATE OF CORRECTION

Patent No. 3,480,630     Dated November 25, 1969

Inventor(s) Helmut Stahle, Werner Kummer, Herbert Koppe and Karl Ze:

It is certified that error appears in the above-identified patent and that said Letters Patent are hereby corrected as shown below:

Col. 3 line 14 - "8-chloroetheophylline" should be --8-chlorotheophylline--.
Col. 4 line 29 - "and sodium" should be --with sodium--;
      line 69 - "imizaboline" should be --imidazoline--.
Col. 8 line 29 - "imidazole" should be --imidazoline--;
      line 41 - "of" should be --or--.
Col. 9 line 10 - "tables" should be --tablets--;
      line 12 - "table" should be --tablet--;
      line 36 - "hyptotensive" should be --hypotensive--;
      line 42 - "toxiv" should be --toxic--.
Col. 10 "  19 - "chloride" should be --chlorine--;
      In Claims 2 through 9, line 1 of each, "according to claim 2" should read --according to claim 1--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents